United States Patent
Koyama

(10) Patent No.: US 9,296,873 B2
(45) Date of Patent: Mar. 29, 2016

(54) METHOD FOR PRODUCING RUBBER COMPOSITION

(71) Applicant: TOYO TIRE & RUBBER CO., LTD., Osaka-shi, Osaka (JP)

(72) Inventor: Shuhei Koyama, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 19 days.

(21) Appl. No.: 14/256,513

(22) Filed: Apr. 18, 2014

(65) Prior Publication Data
US 2015/0051338 A1  Feb. 19, 2015

(30) Foreign Application Priority Data
Aug. 19, 2013  (JP) .................................. 2013-169613

(51) Int. Cl.
C08J 3/00 (2006.01)
C08K 3/36 (2006.01)
C08K 3/04 (2006.01)

(52) U.S. Cl.
CPC .... C08K 3/36 (2013.01); C08K 3/04 (2013.01)

(58) Field of Classification Search
CPC ........................................................ C08K 3/36
USPC ........................................................ 524/572
See application file for complete search history.

(56) References Cited

U.S. PATENT DOCUMENTS 5,534,569 A   7/1996  Etoh
5,705,549 A * 1/1998  Hojo ............................ 524/211
2013/0289165 A1* 10/2013  De Landtsheer et al. ..... 523/351

FOREIGN PATENT DOCUMENTS

JP         07-57828 B2     6/1995

* cited by examiner

Primary Examiner — Hannah Pak
(74) Attorney, Agent, or Firm — Westerman, Hattori, Daniels & Adrian, LLP

(57) ABSTRACT

A method for producing a rubber composition, comprising a first mixing step of causing a diene rubber, a carbon black, and a dihydrazide compound to react with each other in the presence of no silica while the three of the diene rubber, the carbon black, and the dihydrazide compound are kneaded, and a second mixing step of adding a silica to the kneaded product yielded through the first mixing step, and then mixing the silica with the kneaded product.

9 Claims, No Drawings

METHOD FOR PRODUCING RUBBER COMPOSITION

BACKGROUND OF THE INVENTION

1. Field of the Invention

The present invention relates to a method for producing a rubber composition. This rubber composition is useful as a raw material of a vulcanized rubber excellent in bending fatigue resistance.

2. Description of the Related Art

About any vulcanized rubber used for tires, in particular, for treads of tires, from the viewpoint of an improvement in the endurance thereof, it is indispensable to improve the bending fatigue resistance thereof. It is necessary for the improvement to heighten interaction between carbon black, which is a reinforcing-filler, and the rubber.

As a technique for heightening the dispersibility of a reinforcing-filler in a rubber composition, Patent Document 1 listed below describes a technique of blending a hydrazide compound as well as the reinforcing-filler into the rubber composition, which is a raw material.

PRIOR ART DOCUMENT

Patent Document

Patent Document 1: JP-B-7-57828

SUMMARY OF THE INVENTION

However, the inventor has eagerly investigated to make it evident that the precedent technique disclosed in Patent Document 1 has the following problem: the rubber composition tends to be deteriorated in workability and further an improvement in the dispersibility of the reinforcing-filler therein is insufficient. Patent Document 1 makes no mention of the blend of silica into the rubber composition.

In light of the above-mentioned actual situation, the present invention has been made. An object thereof is to provide a rubber composition that can give a vulcanized rubber improved in bending fatigue resistance.

In order to solve the above-mentioned problem, the inventor has eagerly investigated a mechanism that in a rubber composition producing method, a dihydrazide compound heightens interaction between a carbon black and a rubber. As a result, the inventor has found out that in the presence of no silica, a dihydrazide compound reacts with a diene-based polymer and a carbon black to contribute to an improvement in interaction between the diene rubber and the carbon black but in the presence of a silica, reaction between a dihydrazide compound and a carbon black is hindered by the interaction between silanol groups present in the silica surface, and the dihydrazide compound. The present invention has been accomplished by this finding.

Accordingly, the present invention is as follows: a method for producing a rubber composition, including: a first mixing step of causing a diene rubber, a carbon black, and a dihydrazide compound to react with each other in the presence of no silica while the three of the diene rubber, the carbon black, and the dihydrazide compound are kneaded, and a second mixing step of adding a silica to the kneaded product yielded through the first mixing step, and then mixing the silica with the kneaded product.

According to the rubber composition producing method according to the present invention, in the first mixing step, a dihydrazide compound is caused to react with both of a diene rubber polymer and a carbon black in the presence of no silica. In other words, bonds are formed through the dihydrazide compound between the polymer in the diene rubber and the carbon black in the state that reaction between the dihydrazide compound and the carbon black is not hindered by any silica. As a result, interaction between the diene rubber and the carbon black is heightened. The second mixing step is then performed which is a step of adding and blending a silica into the kneaded product in the state that the reaction between the carbon black and the dihydrazide compound has been substantially completed so that the interaction between the diene rubber and the carbon black has been heightened. This process makes it possible to disperse the silica into the kneaded product in the state that the interaction between the diene rubber and the carbon black, which is a strong interaction, is maintained. As a result, the rubber composition producing method according to the present invention gives a rubber composition in which the interaction between the diene rubber and the carbon black is strong. A vulcanized rubber obtained from this rubber composition is improved in bending fatigue resistance.

In the rubber composition producing method, the first mixing step is preferably a step of causing the diene rubber, the carbon black, and the dihydrazide compound to react with each other while the three of the diene rubber, the carbon black, and the dihydrazide compound are kneaded, thereby producing a rubber wet master batch. In this preferred embodiment, the three of the diene rubber, the carbon black, and the dihydrazide compound are caused to react with each other in the presence of no silica to produce, in advance, a rubber wet master batch in which the interaction between the diene rubber and the carbon black is strong (the first mixing step), and next the silica is added to this rubber wet master batch (the second mixing step). As a result, a rubber composition in which the interaction between the diene rubber and the carbon black is strong can be easily and certainly obtained.

In the rubber composition producing method, the second mixing step is performed preferably after at shortest 25 seconds elapse from the start of the first mixing step. In other words, by keeping the period for the reaction between the diene rubber, the carbon black and the dihydrazide compound certainly over at shortest 25 seconds, the interaction between the diene rubber and the carbon black is heightened while the silica can be blended thereinto. As a result, a rubber composition in which the interaction between the diene rubber and the carbon black is strong can be easily and certainly obtained.

The present invention also relates to a rubber composition obtained by the above-mentioned production method of the present invention; and a pneumatic tire obtained by use of this rubber composition. Ina vulcanized rubber obtained by use of the rubber composition as a raw material, the interaction between the diene rubber and the carbon black is strong, so that the vulcanized rubber has a high bending fatigue resistance. Thus, in particular, a pneumatic tire having a tread made of this vulcanized rubber is excellent in endurance.

DETAILED DESCRIPTION OF THE PREFERRED EMBODIMENTS

In the rubber composition producing method according to the present invention, a diene rubber, a carbon black, and a dihydrazide compound are caused to react with each other in the presence of no silica while the three of the diene rubber, the carbon black, and the dihydrazide compound are kneaded (first mixing step).

Not only in the first mixing step but also in the second mixing step, which will be detailed later, a mixing/dispersing device can be usable. This mixing/dispersing device may be, for example, a gear-engaging type Banbury mixer, a tangential line type Banbury mixer, or a kneader. In particular, a gear-engaging type Banbury mixer is preferred.

The first mixing step may be a step of causing the diene rubber, the carbon black, and the dihydrazide compound to react with each other while the three of the diene rubber, the carbon black, and the dihydrazide compound are kneaded, thereby producing a rubber wet master batch. In the case of producing the rubber wet master batch containing the diene rubber, the carbon black and the dihydrazide compound in the first mixing step, various blending agents other than any silica may be added thereto.

Examples of the diene rubber include natural rubber (NR), polyisoprene rubber (IR), polystyrene butadiene rubber (SBR), polybutadiene rubber (BR), chloroprene rubber (CR), and nitrile rubber (NBR). The following is preferably usable: a rubber in which one or more terminals are modified as the need arises (such as terminal-modified BR or terminal-modified SBR), or a rubber in which an original rubber is modified to supply a desired property thereto (such as modified NR). The species of the polybutadiene rubber (BR) may be a species synthesized, using a cobalt (Co), neodymium (Nd), nickel (Ni), titanium (Ti) or lithium (Li) catalyst; or a species synthesized, using a polymerization catalyst composition containing a metallocene complex described in WO 2007-129670.

When the low thermogenic performance of a vulcanized rubber to be obtained is considered, the species of the polystyrene butadiene rubber is preferably a species in which the styrene content by percentage is from 10 to 40% by mass, the vinyl bond content by percentage in its butadiene moieties is from 10 to 70% by mass, and the content by percentage of its cis isomers is 10% or more by mass. The species is in particular preferably a species in which the styrene content by percentage is from 15 to 25% by mass, the vinyl bond content by percentage in its butadiene moieties is from 10 to 60% by mass, and the content by percentage of its cis isomers is 20% or more by mass. When the vulcanized rubber is used for a tread rubber region of a pneumatic tire, it is more preferred to use a polystyrene butadiene rubber species of a non oil-added type than of an oil-added type.

The carbon black may be any carbon black species usable in ordinary rubber industries, such as SAF, ISAF, HAF, FEF or GPF, or may be any electroconductive carbon black Species such as acetylene black or Ketjenblack.

In the rubber composition producing method according to the present invention, the carbon black is blended in an amount preferably from 30 to 70 parts by mass, more preferably from 40 to 60 parts by mass for 100 parts by mass of the diene rubber.

The dihydrazide compound is a compound having, in the molecule thereof, two hydrazide groups ($-CONHNH_2$). Examples thereof include dihydrazide isophthalate, dihydrazide terephthalate, dihydrazide azelate, dihydrazide adipate, dihydrazide succinate, dihydrazide dieicosanoate, and 7,11-octadecadiene-1,18-dicarbohydrazide. Of these compounds, dihydrazide isophthalate and dihydrazide adipate are preferred, and dihydrazide isophthalate is particularly preferred in the present invention.

In order to heighten the interaction between the diene rubber and the carbon black effectively in the rubber composition producing method according to the present invention, the dihydrazide compound is blended in an amount preferably of 0.1 part or more by mass, more preferably of 0.3 part or more by mass, for 100 parts by mass of the diene rubber. The upper limit of the blend amount of the dihydrazide compound is not particularly limited. However, even when the dihydrazide compound is excessively blended, the blend amount thereof merely becomes an amount excessive in relative to the amount of functional groups which the carbon black has. Thus, the dihydrazide compound is blended in an amount preferably of 5 parts by mass or less for 100 parts by mass of the diene rubber.

In the first mixing step, the mixing/discharging temperature of the blended components or the mixture is preferably from 90 to 170° C., more preferably from 100 to 165° C. to prevent rubber-deteriorations, such as rubber scorch, while the reaction rate between the diene rubber, the dihydrazide compound, the carbon black is heightened. From the same viewpoint, the period for mixing the three with each other is preferably from 1 to 4 minutes, more preferably from 1 to 6 minutes.

In the rubber composition producing method according to the present invention, a silica is added to the kneaded product yielded in the first mixing step (second mixing step).

When the first mixing step is not the step of producing the rubber wet master batch containing the diene rubber, the carbon black and the dihydrazide compound, and the second mixing step is performed subsequently to the first mixing step, the second mixing step is performed preferably after at shortest 25 seconds elapse from the start of the first mixing step. Furthermore, the second mixing step is performed in particular preferably after a period of 45 to 130 seconds elapses from the start of the first mixing step. By the addition of the silica after the predetermined time elapses from the start of the first mixing step, the period for the reaction between the diene rubber, the carbon black and the dihydrazide compound can be ensured.

The silica may be wet silica or dry silica, and is in particular preferably wet silica made mainly of hydrated silicic acid.

In the second mixing step, it is preferred to use a silane coupling agent together with the silica. The silane coupling agent may be a silane coupling agent having reaction activity onto the diene rubber. Usable examples of the silane coupling agent in the present invention include sulfidesilanes such as bis(3-triethoxysilylpropyl)tetrasulfide (for example, a product "Si69" manufactured by Degussa GmbH, bis(3-triethoxysilylpropyl)disulfide (for example, a product "Si75" manufactured by Degussa GmbH, bis(2-triethoxysilylethyl) tetrasulfide, bis(4-triethoxysilylbutyl)disulfide, bis(3-trimethoxysilylpropyl)tetrasulfide, and bis(2-trimethoxysilylethyl)disulfide; mercaptosilanes such as γ-mercaptopropyltrimethoxysilane, γ-mercaptopropyltriethoxysilane, mercaptopropylmethyldimethoxysilane, mercaptopropyldimethylmethoxysilane, and mercaptoethyltriethoxysilane; and protected mercaptosilanes such as 3-octanoylthio-1-propyltriethoxysilane, and 3-propionylthiopropyltrimethoxysilane.

The blend amount of the silica used in the rubber composition producing method according to the present invention is preferably from 2 to 40 parts by mass, more preferably from 5 to 30 parts by mass for 100 parts by mass of the diene rubber. When the blend mass of the silica is regarded as 100, the blend amount of the silane coupling agent is preferably from 5 to 15, more preferably from 7 to 12.

In the rubber composition producing method according to the present invention, it is allowable to blend one or more blending agents other than any vulcanization related blending agent into the component-mixed system and mix/disperse the agent(s) with/into the other components at any one of the first mixing step and the second mixing step. Examples of the blending agent(s) other than any vulcanization related blending agent include the carbon black, the silica and the silane coupling agent; and an anti-aging agent, zinc oxide, a softening agent such as stearic acid, wax or oil, a processing aid, and an additional rubber. In the step of mixing the blending agent (s) other than any vulcanization related blending agent, the mixing/discharging temperature of the blended components or the mixture is preferably from about 130 to 170° C. The period for the mixing is preferably from about 3 to 10 minutes.

The anti-aging agent may be any anti-aging agent usable ordinarily for rubbers. Examples thereof include aromatic amine type, amine-ketone type, monophenolic type, bisphenolic type, polyphenolic type, dithiocarbamic acid salt type, and thiourea type anti-aging agents. These may be used alone or in the form of an appropriate mixture. The content of the anti-aging agent(s) is preferably from 0.5 to 4.0 parts by mass, more preferably from 1.0 to 3.0 parts by mass for 100 parts by mass of the rubber component(s).

After the second mixing step, one or more vulcanization related blending agents are blended into the component-mixed system, and the agent(s) is/are mixed/dispersed with/into the other components. Examples of the vulcanization related blending agent(s) used in this vulcanization related blending agent mixing step include vulcanizers such as sulfur and organic peroxides, vulcanization promoters, vulcanization promoting aids, and vulcanization retarders. In the vulcanization related blending agent mixing step, the mixing/discharging temperature of the blended components or the mixture is preferably from about 90 to 130° C. The period for the mixing is preferably from about 1 to 10 minutes.

It is sufficient for the sulfur vulcanizers that their sulfur species is a sulfur species for ordinary rubbers. Examples thereof include powdery sulfur, precipitated sulfur, insoluble sulfur, and highly dispersed sulfur. Considering physical properties, the endurance and others of the rubber component(s) after the component(s) is/are vulcanized, the amount of used one(s) of the sulfur vulcanizers is preferably from 0.5 to 4.0 parts by mass for 100 parts by mass of the rubber component(s) in terms of the amount of sulfur.

The vulcanization promoters may each be a vulcanization promoter usable usually for rubber vulcanization, and examples thereof include sulfenamide type, thiuram type, thiazole type, thiourea type, guanidine type, and dithiocarbamic acid salt type vulcanization promoters. These may be used alone or in the form of an appropriate mixture. The blend amount of used one(s) of the vulcanization promoters is preferably from 0.5 to 4.0 parts by mass for 100 parts by mass of the rubber component(s).

EXAMPLES

Hereinafter, a description will be made about examples which specifically demonstrate the subject matter and the advantageous effects of the present invention, and others. About items for evaluating a rubber composition of each of the examples and the others, the following sample was evaluated on the basis of evaluating methods described below: a rubber sample obtained by heating the rubber composition at 150° C. for 25 minutes to be vulcanized.

(1) Bound Rubber Quantity

At room temperature, 0.5 g of an unvulcanized rubber composition is immersed in toluene for 48 hours, and then the present system is filtrated. The filtration residue is dried and then the weight thereof is measured. The percentage of the rubber component(s) remaining without being dissolved in toluene is defined as the bound rubber quantity of this rubber composition. The evaluation of the rubber composition is made by regarding the value of Comparative Example 1 as 100, and obtaining an index of the rubber composition, which is a value relative to the value of Comparative Example 1. As the resultant numerical value is larger, the composition is larger in bound rubber quantity so that the content by percentage of the rubber adhering to the carbon black particles is larger in the composition. This denotes that the rubber composition is stronger in interaction between its diene rubber and its carbon black.

(2) Bending Fatigue Resistance

In accordance with a bending test described in JIS-K 6301, a measurement is made about a period until a crack having a length of 10 mm is generated in a test sample. The evaluation of the sample is made by regarding the value of Comparative Example 1 as 100, and obtaining an index of the sample, which is a value relative to the value of Comparative Example 1. As the resultant numerical value is larger, the sample is better in bending fatigue resistance.

Preparation of Rubber Compositions:

Comparative Example 1

A natural rubber was charged into a Banbury mixer, and the rubber was kneaded for 30 seconds. Thereafter, thereinto were charged a carbon black, a silica, dihydrazide isophthalate, and other blending agents that are different from any vulcanization related blending agent. The mixture was kneaded for 180 seconds. The resultant kneaded product was discharged from the Banbury mixer, and allowed to stand still for 20 minutes. The kneaded product was again charged into the Banbury mixer, and further vulcanization related blending agents were charged thereinto. The mixture was kneaded for 60 seconds to produce a rubber composition.

Example 1

A rubber composition was produced in the same way as in Comparative Example 1 except that blending agents that are different from any silica and any silane coupling agent (i.e., a carbon black, dihydrazide isophthalate, and other blending agents different from any vulcanization related blending agent) were charged into a Banbury mixer, and then the mixture was kneaded for 30 seconds (first mixing step); and thereinto were charged a silica and a silane coupling agent, and the mixture was kneaded for 120 seconds (second mixing step).

Example 3

A rubber composition was produced in the same way as in Comparative Example 1 except that blending agents that are different from any silica and any silane coupling agent (i.e., a carbon black, dihydrazide isophthalate, and other blending agents different from any vulcanization related blending agent) were charged into a Banbury mixer, and then the mixture was kneaded for 120 seconds (first mixing step); and thereinto were charged a silica and a silane coupling agent, and the mixture was kneaded for 60 seconds (second mixing step).

Example 2

A rubber composition was produced in the same way as in Comparative Example 1 except that a natural rubber, a carbon black and dihydrazide isophthalate were kneaded for 180 seconds to produce a rubber wet master batch (first mixing step); and thereinto were charged a silica, a silane coupling agent, and other blending agents that are different from any vulcanization related blending agent, and the mixture was kneaded for 180 seconds.

Example 4

A rubber composition was produced in the same way as in Comparative Example 1 except that blending agents that are different from any silica and any silane coupling agent (i.e., a carbon black, dihydrazide isophthalate, and other blending agents different from any vulcanization related blending agent) were charged into a Banbury mixer, and then the mixture was kneaded for 180 seconds (first mixing step); and the kneaded product was once discharged from the Banbury mixer and then allowed to stand still for 20 minutes, and subsequently the kneaded product was again charged into the Banbury mixer, thereinto were further charged a silica and a silane coupling agent, and the mixture was kneaded for 60 seconds (second mixing step).

Comparative Examples 2 and 3

In each of these examples, a rubber composition was produced in the same way as in Example 2 except that the formulation of the rubber wet master batch to be produced was changed to one shown in Comparative Example 2 related or Comparative Example 3 related column of Table 1.

Details of each of the rubber component and the blending agents shown in Table 1 are described below (in Table 1, the blend amount of each of the blending agents is shown as the number of parts by mass thereof for 100 parts by mass of the rubber component in each of the examples).

a) Rubber component
  Natural rubber (NR): product "RSS #3"
b) Oil: "PROCESS OIL", manufactured by Japan Energy Corporation
c) Zinc flower: product, "AENKA No. 1", manufactured by Mitsui Mining and Smelting Co., Ltd.
d) Stearic acid: product, "BEADS STEARIC ACID", manufactured by NOF CORPORATION.
e) Sulfur: "powdery sulfur", manufactured by Tsurumi Chemical Industry Co., Ltd.
f) Vulcanization promoter: product, "SOXINOL CZ", manufactured by Sumitomo Chemical Co., Ltd.
g) Carbon black (ISAF): product, "SEAST 7HM", manufactured by Tokai Carbon Co., Ltd.
h) Silica: product, "NIPSIL AQ", manufactured by TOSOH CORPORATION.
i) Anti-aging agent: product, "NOCRAC 6C", manufacturedby OUCHI SHINKO CHEMICAL INDUSTRY CO., LTD.
j) Silane coupling agent: product, "Si 69", manufactured by Degussa GmbH
k) Dihydrazide compound: dihydrazide isophthalate (IDH), manufactured by Japan finechem Co., Inc.

TABLE 1

| Blending agent-charging timing | Blending agent | | Comparative Example 1 | Comparative Example 2 | Comparative Example 3 | Example 1 | Example 2 | Example 3 | Example 4 |
|---|---|---|---|---|---|---|---|---|---|
| — | NR | | 100 | — | — | 100 | — | 100 | 100 |
| Charged after 30 seconds from charging operation of NR | Carbon black | | 38 | — | 38 | 38 | — | 38 | 38 |
| | Silica | | 20 | 20 | 20 | — | 20 | — | — |
| | Silane coupling agent | | 2 | 2 | 2 | — | 2 | — | — |
| | Rubber wet master batch | NR | — | 100 | 100 | — | 100 | — | — |
| | | Carbon black | — | 38 | — | — | 38 | — | — |
| | | Dihydrazide isophthalate | — | — | 0.5 | — | 0.5 | — | — |
| | Oil | | 2 | 2 | 2 | 2 | 2 | 2 | 2 |
| | Anti-aging agent | | 2 | 2 | 2 | 2 | 2 | 2 | 2 |
| | Zinc flower | | 3 | 3 | 3 | 3 | 3 | 3 | 3 |
| | Stearic acid | | 2 | 2 | 2 | 2 | 2 | 2 | 2 |
| | Dihydrazide isophthalate | | 0.5 | 0.5 | — | 0.5 | — | 0.5 | 0.5 |
| Charged after 30 seconds from start of first mixing step | Silica | | — | — | — | 20 | — | — | — |
| | Silane coupling agent | | — | — | — | 2 | — | — | — |
| Charged after 120 seconds from start of first mixing step | Silica | | — | — | — | — | — | 20 | — |
| | Silane coupling agent | | — | — | — | — | — | 2 | — |
| 1) | Silica | | — | — | — | — | — | — | 20 |
| | Silane coupling agent | | — | — | — | — | — | — | 2 |
| 2) | Sulfur | | 1.5 | 1.5 | 1.5 | 1.5 | 1.5 | 1.5 | 1.5 |
| | Vulcanization promoter | | 1.5 | 1.5 | 1.5 | 1.5 | 1.5 | 1.5 | 1.5 |
| Bound rubber quantity | | | 100 | 101 | 103 | 108 | 112 | 109 | 109 |
| Bending fatigue resistance | | | 100 | 101 | 101 | 105 | 108 | 108 | 108 |

1) After the end of the first mixing step, the kneaded product was once discharged from the Banbury mixer, and allowed to stand still for 20 minutes. Thereafter, the kneaded product was again charged into the Banbury mixer, and further the silica and the silane coupling agent were charged thereinto. The resultant mixture was then kneaded for 60 seconds.
2) After the mixing of the blending agents other than any vulcanization related blending agent was finished, the resultant kneaded product was discharged from the Banbury mixer, and allowed to stand still for 20 minutes. Thereafter, the kneaded product was again charged into the Banbury mixer, and the vulcanization related blending agents were charged thereinto. The resultant mixture was then kneaded for 60 seconds.

It is understood from the results in Table 1 that the vulcanized rubber yielded from the rubber composition obtained by the rubber composition producing method according to each of Examples 1 to 4 was strong in interaction between its carbon black and its rubber, and further excellent in bending fatigue resistance.

By contrast, according to the rubber composition producing method according to each of Comparative Examples 2 and 3, when dihydrazide isophthalate reacted with the carbon black, the silica was present; thus, the reaction between the dihydrazide compound and the carbon black was hindered by the silica. It is understood that as a result of the hindrance, the vulcanized rubber yielded from the rubber composition was weak in interaction between its carbon black and its rubber, and was further deteriorated in bending fatigue resistance.

What is claimed is:

1. A method for producing a rubber composition, comprising a first mixing step and a second mixing step, in this order;
   wherein the first mixing step comprising kneading a diene rubber, a carbon black, and a dihydrazide compound for 1 to 6 minutes with each other in order to react with each other in the presence of no silica, and
   wherein the second mixing step comprising adding a silica to the kneaded product from the first mixing step, and then mixing the silica with the kneaded product,
   wherein, during the second mixing step, the silica is blended in an amount of 2 to 40 parts by mass for 100 parts by mass of the diene rubber.

2. The method for producing a rubber composition according to claim 1, wherein the first mixing step produces a rubber wet master batch.

3. The method for producing a rubber composition according to claim 1, wherein the diene rubber is selected from the group consisting of natural rubber, polyisoprene rubber, polystyrene butadiene rubber, polybutadiene rubber, chloroprene rubber, and nitrile rubber.

4. The method for producing a rubber composition according to claim 1, wherein the carbon black is blended in an amount of 30 to 70 parts by mass for 100 parts by mass of the diene rubber.

5. The method for producing a rubber composition according to claim 1, wherein the dihydrizide compound is selected from the group consisting of dihydrazide isophthalate, dihydrizide terephthalate, dihydrazide azelate, dihydrazide adipate, dihydrazide succinate, dihydrazide dieicosanoate, and 7,11-octadecadiene-1,18-dicarbohydrazide.

6. The method for producing a rubber composition according to claim 1, wherein the dihydrizide compound is blended in an amount of 0.1 to 5 parts by mass for 100 parts by mass of the diene rubber.

7. The method for producing a rubber composition according to claim 1, wherein the silica is wet silica.

8. The method for producing a rubber composition according to claim 1, wherein the second mixing step further comprises adding a silane coupling agent together with the silica.

9. A method for producing a rubber composition, comprising a first mixing step and a second mixing step, in this order;
   wherein the first mixing step comprising kneading a diene rubber, a carbon black, and a dihydrazide compound with each other in order to react with each other in the presence of no silica, and wherein the second mixing step comprising adding a silica to the kneaded product from the first mixing step, and then mixing the silica with the kneaded product,
   wherein the second mixing step is performed after at least 25 seconds has elapsed from the start of the first mixing step; and
   wherein, during the second mixing step, the silica is blended in an amount of 2 to 40 parts by mass for 100 parts by mass of the diene rubber.

* * * * *